United States Patent [19]
O'Connor et al.

[11] Patent Number: 5,705,117
[45] Date of Patent: Jan. 6, 1998

[54] METHOD OF COMBINING METAL AND CERAMIC INSERTS INTO STEREOLITHOGRAPHY COMPONENTS

[75] Inventors: Kurt Francis O'Connor, Carmel; Dennis Carl Nohns, Kokomo; William Allen Chattin, Carmel, all of Ind.

[73] Assignee: Delco Electronics Corporaiton, Kokomo, Ind.

[21] Appl. No.: 609,330

[22] Filed: Mar. 1, 1996

[51] Int. Cl.$^6$ .......................... B29C 35/08; B29C 41/20
[52] U.S. Cl. ...................... 264/401; 264/308; 364/468.27
[58] Field of Search .................................. 264/308, 401; 364/468.27

[56] References Cited

U.S. PATENT DOCUMENTS 5,173,220  12/1992  Reiff et al. ............................. 264/401
5,264,061  11/1993  Juskey et al. ....................... 264/401 X

OTHER PUBLICATIONS

Eisenberg, Bart, "The Top 10 Questions to ask about Rapid Prototying," PD&D, pp. 23–24 Feb., 1995.
Lavitt, Michael O., "Personal Modeler Creates 3-D Parts From CAD Designs," Aviation Week & Space Technology, pp. 66–67 Jul. 17, 1995.

Jacobs, Paul, "Stereolithography: From Art to Part," Cutting Tool Engr., 45:3 Apr. '93.

Worthy, Ward, "Complex parts made in photochemical process," C&EN, Apr., 1989.

*Primary Examiner*—Leo B. Tentoni
*Attorney, Agent, or Firm*—Jimmy L. Funke

[57] ABSTRACT

A stereolithography process for developing a prototype part in which inserts of a non-photopolymer material are included within the resulting part so as to develop a functioning prototype part. In order to allow the inserts to be placed within the developing prototype part, a series of STL files are defined for forming the prototype part in individual sections. A non-photopolymer insert is manually positioned on one section of the developing part each time a section is formed. In order to align one section to a subsequent section, alignment structures are developed by the STL files. In order to prevent the STL files from developing supporting structures in the cavities intended for the inserts, a supporting structure file is defined for a parent design, and then later combined with the STL files.

19 Claims, 3 Drawing Sheets

METHOD OF COMBINING METAL AND CERAMIC INSERTS INTO STEREOLITHOGRAPHY COMPONENTS

BACKGROUND OF THE INVENTION

1. Field of the Invention

This invention relates generally to a method of producing a stereolithography part including non-photopolymer components and, more particularly, to a method of producing a stereolithography prototype part that includes non-photopolymer components, such as metal and ceramic inserts, in which the part is formed in sections and each section is aligned by an alignment technique, and in which special support structure files are created to prevent support structure from being developed within insert cavities of the part.

2. Discussion of the Related Art

Most, if not all, products that are to be manufactured for commercial sale are first designed by a designer, and then made into a prototype product so that the actual commercial version of the product can be suitably investigated by various personnel involved in the production of the product prior to incurring the cost of production. The prototype version of the product allows the various personnel to study the product to make any corrections or modifications necessary to increase the probability that the commercial version of the product will perform to its desired expectations. Because developing a prototype of a product is itself an expensive and labor intensive process, it has heretofore been known to use various rapid prototyping and manufacturing (RP&M) techniques to streamline the process from design to prototype, and make it more cost effective. In this regard, RP&M techniques attempt to reduce the cost and time associated with developing a prototype product.

Currently, stereolithography is one of the most popular RP&M techniques. Stereolithography is a process by which a product designed on a computer-aided design (CAD) system, or on other databases, is developed into a solid 3-D object by a photolithography process. As is well understood in the art, CAD is a process by which designers can create a computer generated three-dimensional image of an object. Files from the CAD system are downloaded to a stereolithography machine to develop an actual prototype part made of a photopolymer plastic. In order for the stereolithography machine to decipher the CAD files, software is provided to convert the CAD files into a stereolithography (STL) file format. The process of putting the CAD files into the STL file format includes incorporating bridge work and supporting structure files that support sections of the prototype part as it is being developed to prevent the sections from becoming misaligned during the stereolithography process. Therefore, it is a straightforward process well known in the art to first design a prototype part on a CAD system, and thereafter transfer the CAD files to a stereolithography machine to generate an actual part.

FIG. 1 is a general depiction of a known stereolithography system 10. The system 10 includes a vat 12 containing a liquid photopolymer 14. Various photopolymers are known in the art suitable for the purposes described herein. A support platform 16 holds and positions a prototype part 18 within the vat 12 as it is being developed by the system 10. An ultraviolet laser beam 20 from a laser 22 is directed onto an X-Y scanner 24 through beam shaping optics 26. A motor 28 positions the platform 16 such that the developing prototype part 18 is completely submerged just below a top surface of the photopolymer 14. The scanner 24 directs the ultraviolet radiation beam 20 through the depth of the photopolymer 14 above the prototype part 18 in a controlled manner to develop the photopolymer and create the prototype part 18. Where the photopolymer 14 is sufficiently exposed to the laser beam 20, the photopolymer 14 will harden or cure down to a regulated depth. Controlled movement of the scanner 24 causes a thin layer of the photopolymer 14 above the prototype part 18 to be hardened. The operation of the system 10 is computer controlled by a microprocessor 30.

The platform 16 is systematically lowered in incremental steps so that consecutive layers of the photopolymer 14 are cured to create the prototype part 18. Depending on the specific application, the system 10 forms the prototype part 18 in steps or slices ranging from about 0.001 inches to about 0.030 inches thick. Bridge work 32 is formed by the process between the part 18 and the platform 16, and within open areas of the part 18, as shown. The bridge work 32 allows the part 18 to be separated from the platform 16, and to support the developing part 18. In this manner, the prototype part 18 is developed slice-by-slice based on the CAD files. This process is continued until the entire prototype part 18 is developed.

The stereolithography process as described above is well documented in the literature. For example, see Jacobs, Paul, "Stereolithography: From Art to Part," *Cutting Tool Engineering*, Vol. 45, No. 3, April, 1993.

As the stereolithography process advances, greater demands on the process are desired. Usually the cured photopolymer material is not robust enough to stand up to heat and impact requirements of the commercial product. Therefore, the prototype formed by stereolithography is generally limited to design applications only. However, stereolithography is becoming a more versatile tool for fabricating functioning prototypes, or even the commercial products themselves in some cases. For certain functional prototypes, it is necessary to include different types of inserts and the like positioned within the functioning prototype product. Examples of these inserts include metal leads and ceramic members. Therefore, is desirable to provide a stereolithography system that allows for the inclusion of metal or ceramic inserts as the part is being developed by the stereolithography process.

It is an object of the present invention to provide a stereolithography process that allows for the inclusion of inserts made of a non-photopolymer material.

SUMMARY OF THE INVENTION

In accordance with the teachings of the present invention, a stereolithography process for developing a part is disclosed in which inserts of a non-photopolymer material are included within the resulting part. According to one aspect of the process, parent database files, such as CAD files, are first modified to include cavities for the inserts and are then separated into a series of subpart STL files in which each subpart STL file is used to develop an individual section of the part. The individual sections of the part are separated at locations where the non-photopolymer inserts are to be positioned. A non-photopolymer insert is positioned on one section of the developing part each time a section is formed. In order to align one section to a subsequent section, various alignment structures are developed by the STL files.

Further, in order to prevent support structures and bridge work from being developed in the cavities intended for the inserts, a stereolithography file is first developed from the original CAD file, and a support structure file is then created for the parent stereolithography file. The support structure stereolithography file is then combined with each of the subpart stereolithography files.

Additional objects, advantages and features of the present invention will become apparent from the following description and appended claims taken in conjunction with the accompanying drawings.

DETAILED DESCRIPTION OF THE PREFERRED EMBODIMENTS

The following discussion of the preferred embodiments directed to a stereolithography apparatus and method for generating stereolithography parts including inserts of a non-photopolymer material is merely exemplary in nature and is in no way intended to limit the invention.

This invention proposes various techniques that allow the known stereolithography process to develop prototype parts that incorporate one or more non-photopolymer inserts, such as metal and/or ceramic inserts, that are not developed by curing the photopolymer during the stereolithography process. One of these techniques has to do with separating the database files that define the design image of the prototype part into a series of subpart STL files in which each subpart STL file is to be separated by an insert. The database files that define the design image of the prototype part are generally CAD files, and will be described as such below. However, it will be appreciated by those skilled in the art that other database files from other data sources, such as a CAT scan or a mechanical digitizer, may also be used. The CAD files are separated into the series of subpart STL files so that a non-photopolymer insert can be placed on a section of the developing part, produced by one STL file, so that a subsequent section of the part can be formed by the stereolithography process on and around the non-photopolymer insert.

A problem exists with the above described situation. Because each section of the developing prototype part is formed from a separate STL file, the stereolithography system will attempt to align the individual sections relative to the platform 16, as opposed to the previously developed section. Consequently, because the different sections may have different dimensions, overhangs, sizes, etc., a subsequent section may not properly aligned to a previous section. Therefore, some mechanism must be included to align the subsequent sections to the initial section first developed on the platform 16.

Figure 2:
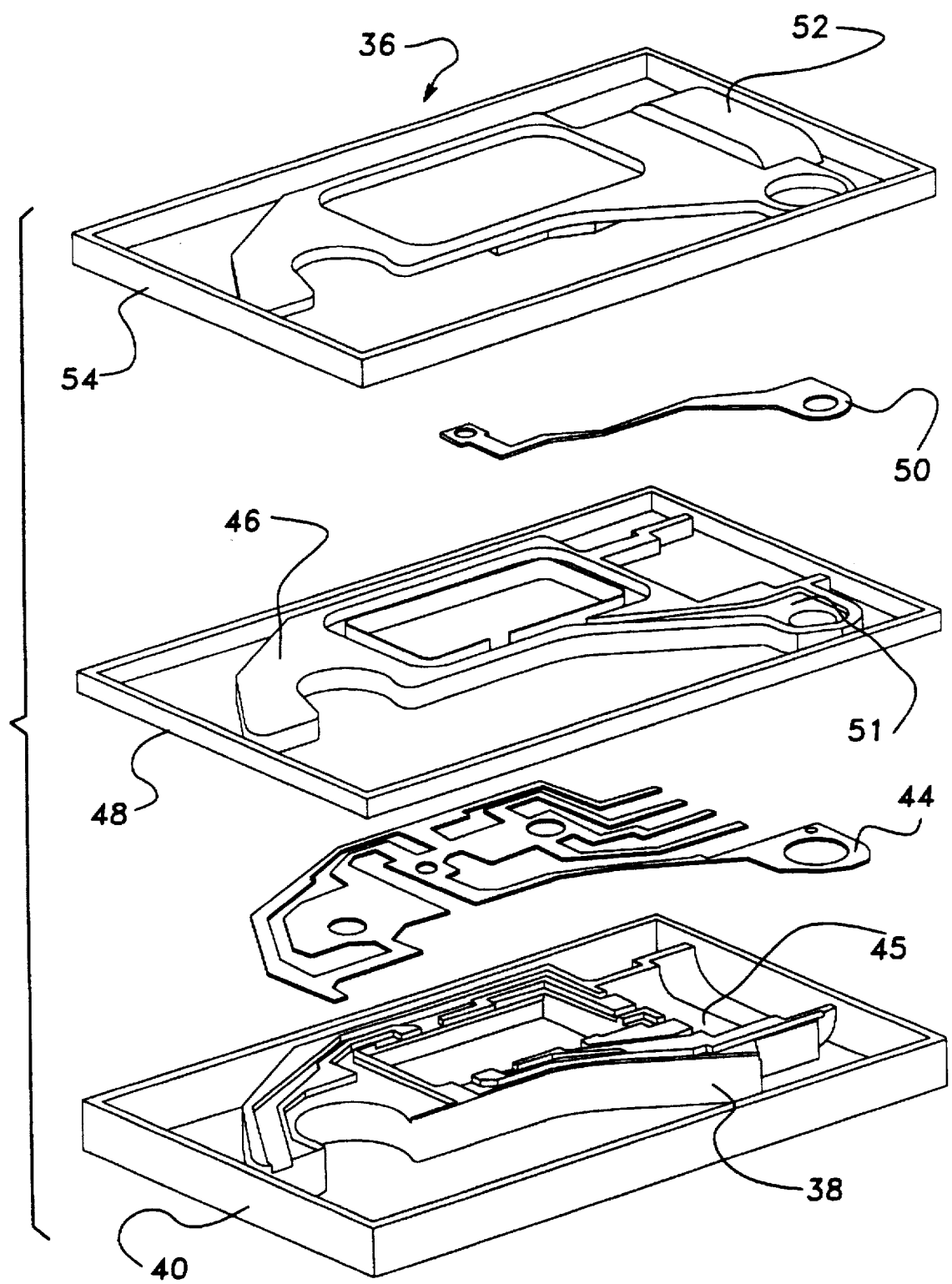
FIG. 2 shows a blown apart perspective view of a voltage regulator that includes metal electrode leads within a photopolymer material created by a stereolithography process of the invention.

FIG. 2 shows a blown apart perspective view of a prototype part 36 developed by a stereolithography process of the invention. In this embodiment, the stereolithography prototype part 36 is a voltage regulator having an application for use in an automobile. It is stressed, however, that the use of the stereolithography process of the invention as described below is applicable to make many different types of prototype parts. The description of developing a voltage regulator is merely by way of a non-limiting example. As is well understood in the art, a voltage regulator for this type of application includes various electronic components and leads embedded within a plastic housing. Prior stereolithography processes that would develop a prototype part of a voltage regulator of this type would make all of the individual parts and components of the voltage regulator out of the cured photopolymer. Such a device would not be a functioning prototype. However, a need exists to develop a functioning prototype part to further investigate the operation and appearance of the regulator for subsequent production. The metal leads of the functioning prototype obviously cannot be developed by the stereolithography process. Therefore, in order to have a functioning prototype part, the metal leads need to be inserted during the stereolithography process.

The prototype part 36 depicted in FIG. 2 includes a lower section 38 developed by the stereolithography process. The lower section 38 would be developed on the platform 16, and would include a supporting structure (not shown) necessary to separate the part 36 from the platform 16. The lower section 38 is formed from a first subpart STL file that is independent from the files forming the remaining sections of the part 36. In order to provide alignment of the lower section 38 to subsequent sections, the first STL file includes a lower centering fence 40 supported on the platform 16 and surrounding the section 38. The centering fence 40 provides orientation for the upper sections (discussed below), and is thus not actually in contact with the section 38.

Once the stereolithography process develops the lower section 38, the platform 16 is raised above the top level of the photopolymer 14 within the vat 12, and a metal lead structure 44 is manually inserted on top of the section 38 in an appropriately configured cavity 45 formed in the section 38, as shown, by the stereolithography process. Once the insert 44 is placed in the cavity 45 in the section 38, the motor 28 lowers the platform into the vat 12 such that the photopolymer covers the section 38 and the lead structure 44. A second subpart STL file then begins to develop an intermediate section 46 over the lower section 38 to enclose the lead structure 44. Normally, the second STL file would orient the intermediate section 46 relative to the platform 16, instead of the lower section 38. Because the intermediate section 46 may have a different configuration and be of a different size than the lower section 38, this alignment may not be proper. In order to properly align the intermediate section 46 to the lower section 38, instead of the platform 16, an intermediate centering fence 48 is included in the second STL file that is oriented by the system 10 to the lower centering fence 40. In this manner, the section 46 is properly aligned to the lower section 38.

The second STL file develops the intermediate section 46 so that it is formed as a single unit with the lower section 38. The system 10 then raises the developing prototype part 36 out of the vat 12. Now the prototype part 36 is ready for a second lead structure 50 to be placed on a top surface of the intermediate section 46 within an appropriately configured cavity 51, as shown, in the proper orientation relative to the developing part 36. The part 36 is then again lowered into the vat such that a top surface of the lead structure 50 and the intermediate section 46 are just below a top surface of the photopolymer 14 at a suitable depth. A third subpart STL file then begins to form an upper section 52 on the intermediate section 46. In order to align the upper section 52 to the intermediate section 46, and thus be aligned to the lower section 38, a top centering fence 54 is included in the third STL file to be oriented to the centering fences 40 and 48. In this manner, the upper section 52 is suitably aligned with the developing prototype part 36. The upper section 52 completes the prototype part 36 which can then be removed from the platform 16 separate from each of the centering fences 40, 48 and 54. The resulting prototype part 36 is a single unit including appropriately configured metal lead structures.

The insertion of the lead structures 44 and 50 within the prototype part 36 is used to describe the invention by way of a non-limiting example. Many different prototypes parts applicable to be developed by the stereolithography process could also include other types of non-polymer inserts such as ceramic inserts. The development of these parts would be the same as that of the prototype part 36 in that as the part was being developed, the process would be paused so that what ever insert was needed could be manually placed on the developing part.

Figure 1:
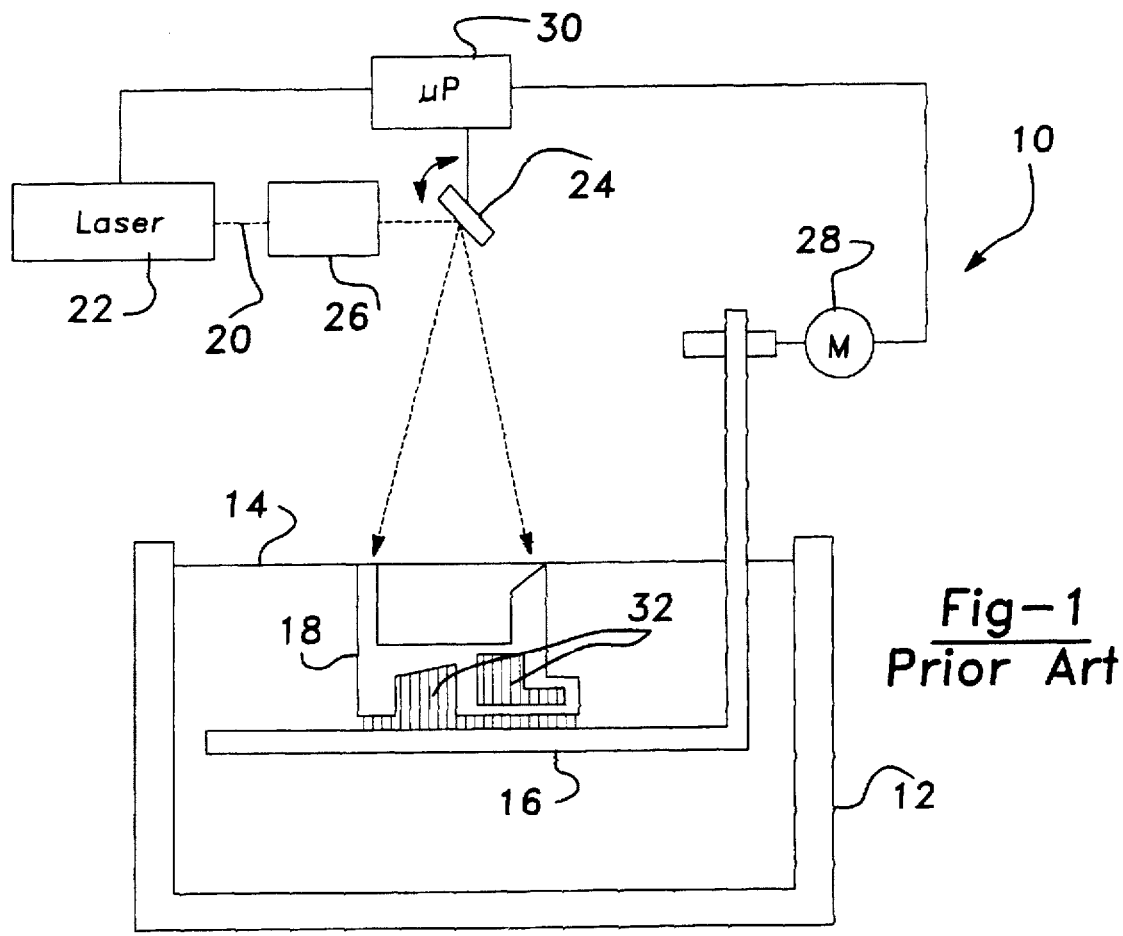
FIG. 1 shows a side view of a prior art stereolithography apparatus.
Figure 3:
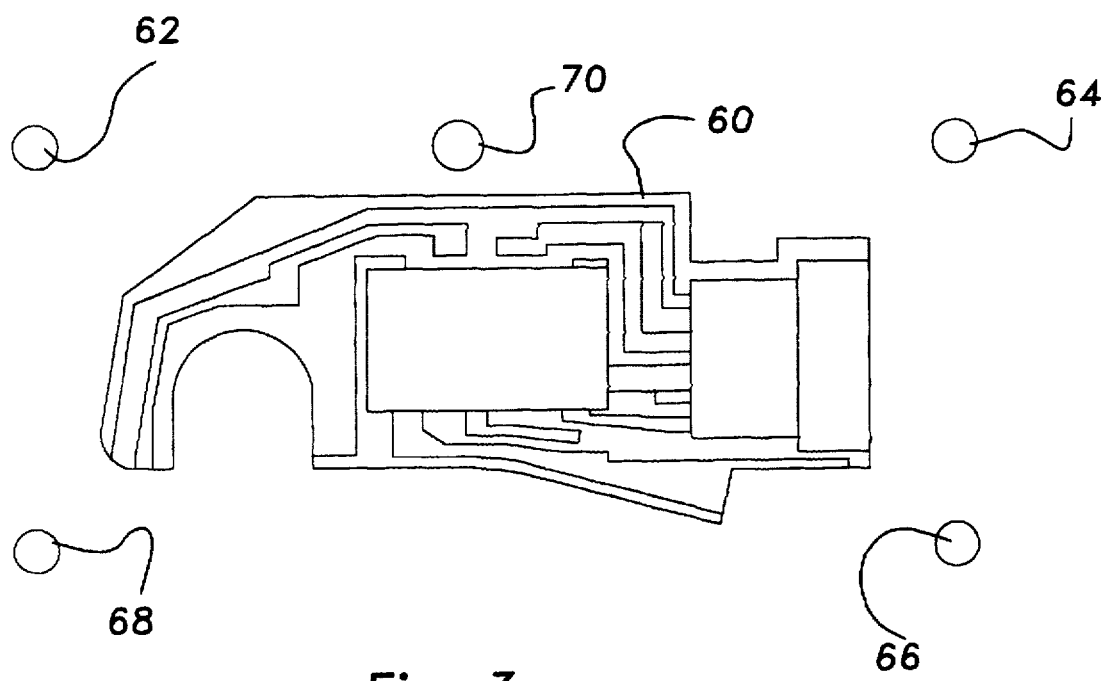
FIG. 3 shows a top view of a part formed by a stereolithography method utilizing a post aligning scheme according to an embodiment of the present invention.

Moreover, the centering fence technique offers one way in which the separate STL files can be aligned to each other to provide the desirable resulting part. In an alternate embodiment, the centering fence can be eliminated and centering posts (or other shaped structure) can be used to align the different sections. FIG. 3 shows a top view of a section 60 of a prototype part that is identical to the section 38 of the prototype part 36. Instead of using the centering fence 40, the section 60 is aligned to subsequent sections by the use of posts 62, 64, 66 and 68 placed at each corner of a rectangle defining a perimeter around the section 60. Alternately, three posts can be used in a triangular configuration, for example, by replacing the posts 62 and 64 with a single post 70 to provide an orientation of the outer perimeter of the developing part. Also, two diagonal posts, such as posts 62 and 66, or posts 64 and 68, can be used. In this example, the two posts would give minimum X-Y and maximum X-Y coordinate positions to align the sections. The cylindrical posts are used as one geometric configuration, but it will be appreciated by those skilled in the art, that other geometrical shapes, such as square posts can also be used. Each of the subsequent sections would have the identical posts as the section 60 that were aligned to each other by the separate STL files.

Another area of the invention that is important for allowing non-polymer inserts to be placed in a stereolithography part has to do with the elimination of bridge work and supporting structures that may be formed within the cavities intended to be filled by the inserts. As is well understood in the art, the STL files include bridge work supporting structure files that are merged with the parent CAD files. The supporting structure files keep the developing prototype part together as it is being produced by the stereolithography process. Because these prototype parts include overhangs, openings, canals, etc., it is necessary to provide interconnecting and supporting bridge work structures as the part is being developed so as to prevent sections of the prototype part from floating in the vat 12 and becoming misaligned as it is being developed. Two commercially available bridge work supporting programs are available from Three Dimensional, Inc., namely Bridge Work Supporting Structure and Maestro, for this purpose. Other available bridge work supporting programs may also be utilized.

In order to prevent the bridge work files from developing supporting structures within the cavities intended for the inserts, it is proposed by this invention to first develop a parent model in an STL file of the prototype part that will not include any of the cavities necessary for the inserts so that the resulting bridge work structure portion of the STL file will not include supports in this area. Then, the bridge work portion of the STL file of the parent model is merged with the subpart STL files that have been modified to include the cavities for the inserts so that the resulting STL files do not include bridge work structure within the cavities.

Figure 4:
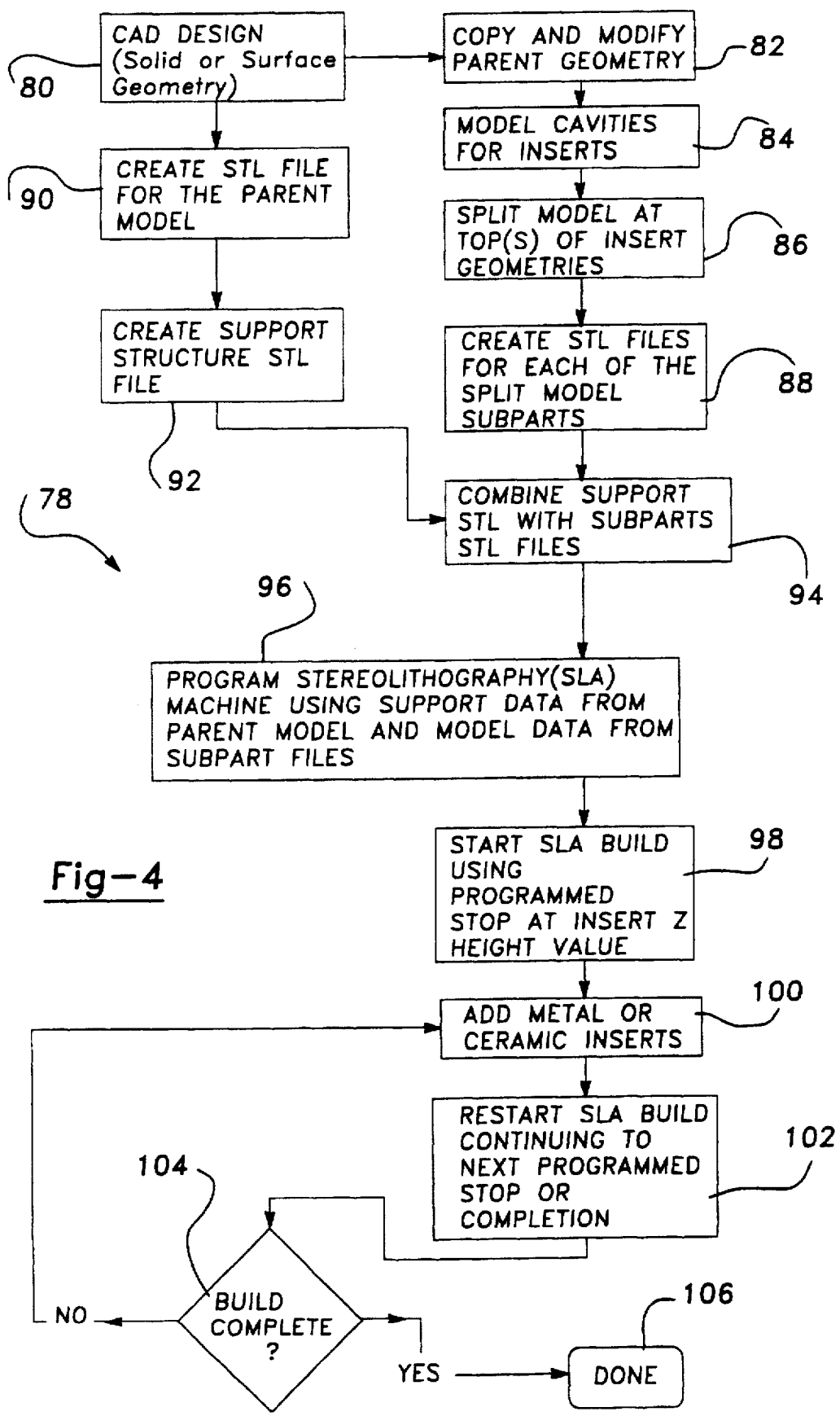
FIG. 4 shows a flow chart diagram of a stereolithography process incorporating the various techniques of the invention.

FIG. 4 shows a flowchart diagram 78 depicting a stereolithography process of the various aspects of the invention, as described above. A box 80 represents the parent CAD or other database design of the prototype part in either solid or surface geometry to be developed by the stereolithography process. The CAD design file is then copied as represented by box 82. The cavities for the inserts of the prototype part are then modeled as represented by box 84. The cavities are slightly larger and deeper than is necessary for the actual inserts so as to allow the inserts to be readily placed in the developing part during the process. The CAD design is then separated or divided at each location where the process is to be paused, and the inserts are to be positioned, as represented by box 86. Next, separate subpart STL files for each of the separate model subparts are created as represented by box 88.

The CAD design is also used to create a parent model STL file, as represented by box 90. The CAD design may or may not include designed features for the insert, depending on the specific application. In either case, the parent model STL file would not include cavities for the inserts. The parent model STL file is then used to create a support structure STL file as represented by box 92. As discussed above, the support structure will keep the developing prototype part intact as it is being developed. The support structure STL file that is created based on the parent model STL file is then combined with the several subpart STL files as represented by box 94. Because the parent model STL file did not include insert cavities, no support structure will be developed for the cavities of the several subpart STL files.

The microprocessor 30 is then programmed using the support data from the support structure STL file and the model data from the subpart STL files to create the appropriate STL files that do not include support structure in the cavities for the insert, as represented by box 96. The system 10 begins the buildup of the first section on the platform 16 from the first subpart STL file. The system 10 is stopped or paused after the first subpart is developed as indicated by box 98. The next step is to add the metal or ceramic insert within the appropriately configured cavities as represented by box 100. The operation is then continued to build the next subpart on top of the first subpart from the second subpart STL file, as indicated by box 102. If the entire part is completed after a second build-up as determined by decision diamond 104, then the process is done as is indicated by box 106. If, however, alternate inserts are to be placed on subsequent subparts, the process goes back to the step of adding the metal or ceramic steps at the box 100, and continues from there.

The foregoing discussion discloses and describes merely exemplary embodiments of the present invention. One skilled in the art will readily recognize from such discussion, and from the accompanying drawings and claims, that various changes, modifications, and variations can be made therein without departing from the spirit and scope of the invention as defined in the following claims.

The embodiments of the invention in which an exclusive property or privilege is claimed are defined as follows:

1. A method of performing a stereolithography process, said method comprising the steps of:

providing a stereolithography machine;

developing a first stereolithography section on a platform of the stereolithography machine, said step of developing a first section including simultaneously developing a first section alignment structure;

positioning a non-photopolymer insert within an insert cavity formed in the first section; and developing a second stereolithography section on the insert and the first section, said step of developing a second section including simultaneously developing a second section alignment structure, wherein the second alignment structure aligns with the first alignment structure to align the second section to the first section.

2. The method according to claim 1 wherein the first alignment structure is a first alignment fence surrounding the first section and the second alignment structure is a second alignment fence surrounding the second section.

3. The method according to claim 1 wherein the first alignment structure and the second alignment structure are a series of alignment posts.

4. The method according to claim 3 wherein the series of alignment posts are four alignment posts placed at four corners defining an outer perimeter of the first and second sections.

5. The method according to claim 3 wherein the series of alignment posts are three alignment posts defining an outer perimeter of the first and second sections.

6. The method according to claim 3 wherein the series of alignment posts are two alignment posts positioned at opposite diagonal corners of the first and second sections.

7. The method according to claim 1 wherein the step of positioning a non-photopolymer insert includes positioning a non-photopolymer insert selected from the group consisting of metal inserts and ceramic inserts.

8. The method according to claim 1 further comprising the steps of positioning a non-photopolymer insert within an insert cavity in the second section and developing a third stereolithography section on the insert and the second section, said step of developing a third section including simultaneously developing a third section alignment structure, wherein the third alignment structure aligns with the first and second alignment structures to align the third section to the first and second sections.

9. The method according to claim 1 further comprising the step of generating a plurality of subpart stereolithography files in which a first subpart stereolithography file defines the first stereolithography section and a second subpart stereolithography file defines the second stereolithography section.

10. The method according to claim 9 further comprising the steps of creating a parent stereolithography file based on a parent model design where the parent model design does not include the insert cavity, creating a support structure stereolithography file for the parent stereolithography file, and combining the support structure stereolithography file with the plurality of subpart stereolithography files, said step of developing a first stereolithography section including developing the first stereolithography section based on the first subpart stereolithography file and the support structure stereolithography file and said step of developing the second stereolithography section including developing the second stereolithography section based on the second subpart stereolithography file and the support structure stereolithography file.

11. A method of providing a stereolithography file, said method comprising the steps of:

providing a parent model design;

creating a parent stereolithography file based on the parent model design;

creating a support structure stereolithography file based on the parent stereolithography file;

creating a plurality of separate subpart stereolithography files based on the parent model design where each subpart stereolithography file generates a separate section, wherein at least one of the separate subpart stereolithography files includes a cavity modeled to accept an insert, said parent stereolithography file not including the cavity; and combining the support structure stereolithography file with each of the subpart stereolithography files so as to create a final stereolithography file which prevents the support structure from being generated in the cavity.

12. The method according to claim 11 wherein the step of creating a plurality of separate subpart stereolithography files includes the steps of creating a first subpart stereolithography file that defines a first stereolithography section and creating a second subpart stereolithography file that defines a second stereolithography section, said method further comprising the steps of developing the first stereolithography section on a platform of a stereolithography machine, said step of developing a first section including simultaneously developing a first section alignment structure, positioning a non-photopolymer insert within an insert cavity formed in the first section, and developing the second stereolithography section on the insert and the first section, said step of developing the second section including simultaneously developing a second section alignment structure, wherein the second alignment structure aligns with the first alignment structure to align the second section to the first section on the platform.

13. The method according to claim 12 wherein the first alignment structure is a first alignment fence surrounding the first section and the second alignment structure is a second alignment fence surrounding the second section.

14. The method according to claim 12 wherein the first alignment structure and the second alignment structure are a series of alignment posts.

15. The method according to claim 12 wherein the non-photopolymer insert is selected from the group consisting of metal inserts and ceramic inserts.

16. A method of performing a stereolithography process, said method comprising the steps of:

providing a stereolithography machine that performs the stereolithography process;

providing a parent model design;

creating a modelled parent model design that includes an insert cavity for accepting an insert in the parent model design;

creating a first subpart stereolithography file and a second subpart stereolithography file based on the modeled parent model design, said first subpart file defining a first section and said second subpart file defining a second section;

creating a parent stereolithography file based on the parent model design;

creating a support structure stereolithography file based on the parent stereolithography file;

combining the support structure stereolithography file with the first and second subpart files so as to create a final stereolithography file so that support structures will not be generated in the cavity by the stereolithography process;

developing the first stereolithography section on a platform of the stereolithography machine, said step of developing the first section including simultaneously developing a first section alignment structure and the insert cavity;

positioning a non-photopolymer insert within the insert cavity in the first section; and developing the second stereolithography section on the insert and the first section, said step of developing the second section including simultaneously developing a second section alignment structure, wherein the second alignment structure aligns with the first alignment structure to align the second section to the first section.

17. The method according to claim 16 wherein the first alignment structure is a first alignment fence surrounding the first section and the second alignment structure is a second alignment fence surrounding the second section.

18. The method according to claim 16 wherein the first alignment structure and the second alignment structure are a series of alignment posts.

19. The method according to claim 16 wherein the non-photopolymer insert is selected from the group consisting of metal inserts and ceramic inserts.

* * * * *